United States Patent [19]

Scholich

[11] Patent Number: 4,553,177
[45] Date of Patent: Nov. 12, 1985

[54] METHOD AND APPARATUS FOR RECORDING DATA

[75] Inventor: Peter Scholich, Schloss-Neuhaus, Fed. Rep. of Germany

[73] Assignee: Nixdorf Computer AG, Paderborn, Fed. Rep. of Germany

[21] Appl. No.: 550,243

[22] Filed: Nov. 9, 1983

[30] Foreign Application Priority Data

Nov. 9, 1982 [DE] Fed. Rep. of Germany ....... 3241400

[51] Int. Cl.⁴ ............................ G11B 5/09; G11B 5/27
[52] U.S. Cl. ......................................... 360/43; 360/121
[58] Field of Search ............................ 360/43, 121, 54

[56] References Cited

U.S. PATENT DOCUMENTS

| | | | |
|---|---|---|---|
| 3,107,347 | 10/1963 | Huss | 360/54 |
| 3,499,977 | 3/1970 | DeLange | 360/121 |
| 3,881,191 | 4/1975 | Potter et al. | 360/121 |
| 3,949,193 | 4/1976 | Dowdell | 360/43 |
| 4,184,179 | 1/1980 | Deming | 360/43 |
| 4,232,216 | 11/1980 | Helle | 360/43 |

Primary Examiner—Vincent P. Canney
Attorney, Agent, or Firm—Krass & Young

[57] ABSTRACT

In the recording of information signals the signal elements of which are to have a prescribed length, a read/write head (WRT) is used in which the write gap (W1) is at a distance from the read gap (R) corresponding to the prescribed length. When a signal edge occurs at the read gap (R), an evaluation circuit (FIG. 4) controls the write gap (W1) in such a way that the latter records the next signal edge. For recording by the NRZ process, a further write gap (W2) can be provided between the write gap (W1) and the read gap R, which is controlled like the first and makes possible the recording of binary signals.

5 Claims, 4 Drawing Figures

METHOD AND APPARATUS FOR RECORDING DATA

DESCRIPTION

1. Technical Field

The invention relates to a process for the continuous recording of signals of predetermined length on a magnetic track by means of an electromagnetic transducer to which the signals are fed in periods of time corresponding to said length. Moreover the invention relates to an apparatus for carrying out the process.

2. Background of the Invention

The continuous recording of signals of predetermined length on a magnetic storage track must be done with high accuracy, particularly when the information recorded must be assured of a high evaluation accuracy. Such an application case, for example, is the recording of information signals on magnetic storage tracks which are located on instruction cards or identification cards. For this application it is particularly important that the recording take place with no permissible variance insofar as possible, which in particular means that prescribed signal lengths or bit spacings are adhered to with the highest accuracy.

In order to ensure the recording of the signals as accurately as possible at the prescribed positions on a magnetic storage track, a mechanicooptical length or speed evaluation had previously been made during the motion of the magnetic storage track relative to an electromagnetic transducer, in order in this way to ascertain the predetermined positions on which magnetic flux variations are to be recorded. The high accuracy striven for can however be achieved thereby only with a disproportionately high mechanical and electronic complexity, which has caused the corresponding recording units to be very expensive.

A process and an apparatus of the type mentioned at the outset are known from French Pat. No. 2,452,148, in which the prescribed high accuracy of recording can be adhered to independently of the speed of the relative motion between magnetic storage track and electromagnetic transducer as well as of variations in this speed. Mechanico-optical clock generator units for evaluating the speed or length during the relative motion are no longer required, since the distance along which magnetic flux variations are to be generated in the magnetic storage track is prescribed by the distance between read position and write position. When a magnetic flux variation is generated at the write position and this reaches the read position after passing through the distance corresponding to the predetermined length, then the read position evaluates this variation in magnetic flux on the basis that at this moment a renewed magnetic flux variation is generated at the write position, without any control dependent on evaluation of length or speed being required for this renewed recording. The accuracy of the distances generated in this manner between the separate magnetic flux variations then corresponds to the accuracy with which the distance between read position and write position is achieved. This principle is used in the known case for recording timing signals. This can be followed by an information recording.

It is the problem of the invention to make possible a direct recording of binary information signals by the use of the known principle.

This problem is solved by a process wherein for recording binary information signals of identical length which differ within their length through a variation in magnetization, the information signals of one value are written at the fixed length WRITE position and the information signals of another value are written at a second WRITE position which lies at a reduced distance in the direction of relative transducer/track motion.

A recording process in which binary information signals of identical length are to be recorded which are different within their length through a variation in magnetization is the so-called NRZ process. When there is a change from the first to the second binary value in this process, then the second write position need only be activated instead of the first write position, in which way the signal elements which are then recorded automatically obtain a shorter length than in the recording of the first binary value, where two signal elements of this type respectively again show the predetermined length of the information signals and form an information signal of the second binary value, in the length of which a variation in magnetization is provided which distinguishes this information signal from the information signal of the first binary value.

It is advantageous for the recording at the first write position to be controlled by the information signals of the two binary values being recorded and the recording at the second write position to be controlled by the information signals of the second binary value being recorded. This has the effect that, regardless of whether information signals are to be recorded at the first write position or not, the second write position always has a magnetic storage track fed to it which shows a definite magnetization state of one or the other direction. In this manner interferences and faulty evaluations of the total information recorded last will be avoided.

BRIEF DESCRIPTION OF THE DRAWINGS

One embodiment example of the invention as well as an apparatus for carrying out the process are described in the following on the basis of the figures. In these.

BEST MODE FOR CARRYING OUT THE INVENTION

Figures 1, 2:
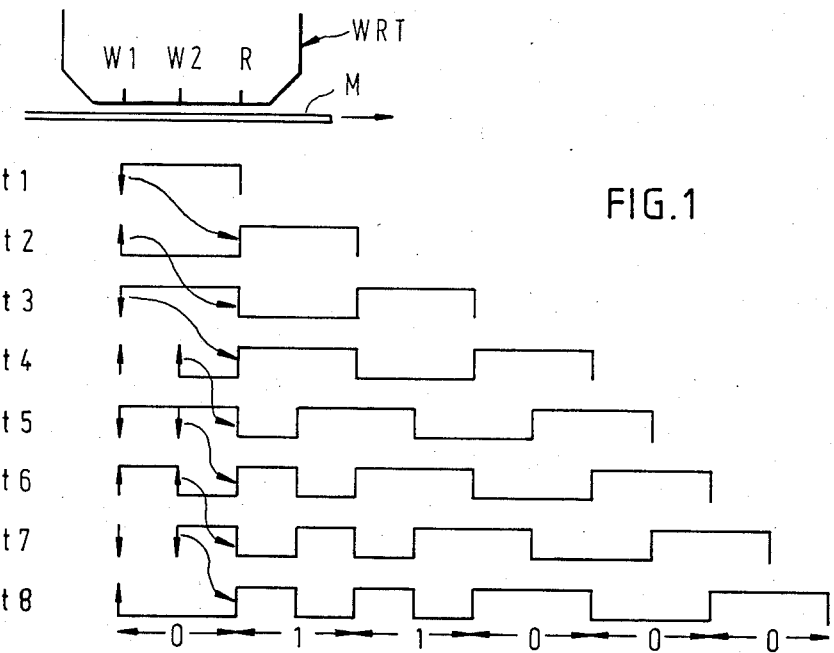
FIG. 1 shows a diagrammatic representation of the operating sequence for a plurality of successive instants.
FIG. 2 shows a tabular representation of the operating sequence shown in FIG. 1.

In FIG. 1 is diagrammatically represented an electromagnetic transducer WRT, which can also be designated as a read/write head, and a first write gap W1, a second write gap W2 and a read gap R. The first write gap W1 has a prescribed distance from the read gap R which should correspond to the length of signals which are to be recorded with the transducer WRT on a magnetic storage track M which can move past the transducer WRT in the direction of the arrow shown in FIG. 1. For recording an information signal by the abovementioned NRZ process, in this example using F2F, the prescribed signal length according to appropriate standardization is for example 339 micrometers, so that the distance from the first write gap W1 to the read gap R must have this length if for example recording is to be done by this process. This case of an information signal recording is assumed in the following.

The second write gap W2 is located approximately in the center between the first write gap W1 and read gap R, so that its distance from the first write gap W1 and from the read gap R must be 169 micrometers.

In the following, on the basis of the pulse-shaped magnetization curves for eight different instants of time t1 to t8 shown in FIG. 1, it is explained how the signal sequence 000110 provided as an example is recorded on the magnetic storage track M with the use of the transducer WRT. Firstly, it is assumed for this that the first write gap W1 is switched on at an instant of time t0 not shown in FIG. 1, so that it generates a defined magnetization state of the magnetic storage track M. The start of this magnetization state then appears on the read gap R at the instant of time t1 and there it causes the delivery of a read pulse edge by the transducer WRT by means of which, in a manner yet to be described, a reversal of the magnetization is done which generates the first write gap W1 on the magnetic storage track M. This is represented in FIG. 1 at the instant t1 by a dropping pulse edge, designated by an arrow, of the state of magnetization. By reason of the relative motion of the magnetic recording track M relative to the transducer WRT, a state of prescribed magnetization is formed on the magnetic storage track M which has a length exactly corresponding to the distance between the first write gap W1 and the read gap R. This involves a recorded information signal which can be evaluated by a later read operation, which according to the definition of the NRZ process has the binary value 0.

Upon a further movement of the magnetic recording track M in the direction of the arrow in FIG. 1, the change in magnetization generated at the instant of time t1 and characterized by a dropping pulse edge reaches the read gap R at the instant t2 and there it generates a transducer signal which is used for controlling the magnetization generated with the write gap W1 in such a way that this in turn generates a change in magnetization at the instant t2 which now runs counter to the previous change in magnetization and is characterized by an arrow as a rising pulse edge in FIG. 1. When this pulse edge reaches the read gap R at the instant t3, then the latter at the same instant gives rise to a further change in magnetization at the write gap W1, which is represented as a dropping edge of the magnetization state. In this manner, as shown in FIG. 1, a sequence of three magnetization states of identical length are recorded on the magnetic recording track M which respectively reproduce the binary value 0.

According to the assumption, the value 1 will be recorded as the next binary value. According to the definition of the NRZ process this consists of two successive differing states of magnetization of identical length, which as a total should have the length of the binary value 0. In a manner yet to be described, the second write gap W2 is switched on when the dropping magentization edge generated at the instant t3 arrives at the read gap R, which in FIG. 1 is represented at the instant t4 by a rising magnetization flank. At the same time, the first write gap W1 is switched on equidirectionally with the second write gap W2 in order in turn to generate a defined magnetization state.

When the rising magnetization edge generated with the second write gap W2 reaches the read gap R at the instant t5 due to the further motion of the magnetic storage track M, then this read gap gives rise to a dropping magnetization edge at the second write gap W2, which edge is overwritten on the magnetization state generated with the first write gap W1. The first write gap W1 remains activated at the instant t5 as it was before.

At the instant t6 the dropping magnetization edge which was previously generated with the second write gap W2 is located at the read gap R, so that, as FIG. 1 shows at t6, the signal sequence 0001 is recorded on the magnetic storage track M. For recording another binary value 1, the second write gap W2 is activated once more at the instant t6 by the dropping magnetization flank which is in effect at the read gap R, and activated now in such a direction that a rising magnetization edge is formed. The first write gap W1 remains activated like W2. At the instant t7 the rising magnetization edge generated with the second write gap W2 is at the read gap R, and in turn by way of this a magnetization variation will be caused at the second write gap W2, which is represented as a dropping magnetization edge. At the same time, the first write gap W1 is reversed by having the control circuit, which is yet to be described, again cause the writing of a binary value of 0 again after the second binary value 1. At the instant of time t8 the dropping magnetization edge generated at t7 with the second write gap W2 is located at the read gap R, so that this can give rise to a reversal of the first read gap W1, thereby terminating the binary value 0. FIG. 1 shows at t8 that by this instant of time the signal sequence 000110 has been recorded as a whole on the magnetic recording track M.

It can now be seen that the instants of time t1 to t8 shown in FIG. 1 have different time distances from one another, the lengths of which depend on whether the binary value 0 or the binary value 1 is to be recorded.

In FIG. 2, for a better clarification of the operations described on the basis of FIG. 1, the activation of the write gaps W1 and W2 at the instants t0 to t8 dependent on the read operation with the read gap R are represented in tabular form. At the same time the right part of the table states which binary number is respectively being recorded between the individual instants of time. For the two write gaps W1 and W2 it is respectively denoted by arrows that they are activated in one magnetization direction or the other. So it can be recognized that at the instant of time t0 the write gap W1 is activated in a first direction, which at the instant t1 is identified by the read gap R, so that the latter can cause the reversal of the write gap W1. In this manner, between t0 and t1 the first binary value is recorded. The table of FIG. 2 then shows further that with each driving of the read gap R, either the write gap W1 alone or this together with the write gap W2 becomes reversed or active in the way that was explained previously on the basis of FIG. 1. It may also be seen that the second write gap W2, after the recording of the binary value 1 after which there is to be a change to the binary value 0, becomes switched to the inactive state in order to prevent interfering recordings.

Figure 3:
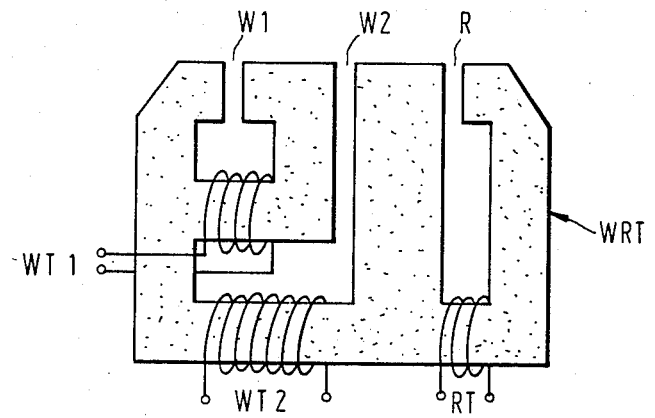
FIG. 3 shows a diagrammatic representation of an electromagnetic transducer for carrying out the process.

FIG. 3 shows in a diagrammatic representation a possible basic construction of the transducer WRT with its first write gap W1, its second write gap W2 and its read gap R. The iron core of the transducer WRT is constructed in such a way that for each gap a separate magnetic circuit is formed which can be controlled respectively by a winding WT1, WT2 and RT which is indicated diagrammatically. It may be recognized that the three magnetic circuits formed in this way in a single read/write head do not influence one another, although they have parts in which the magnetic fluxes of two magnetic circuits overlap. The construction of combined read/write heads for recording or magnetic storage tracks is known to one skilled in the art, so that any further discussion is superfluous here.

Figure 4:
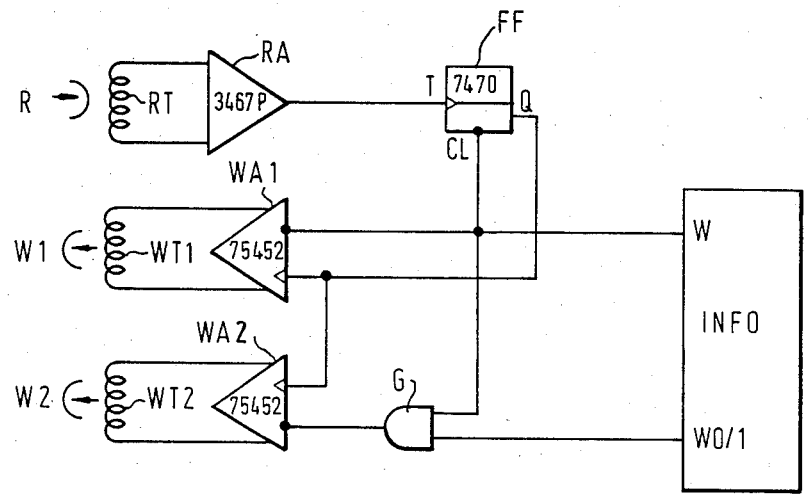
FIG. 4 shows a basic circuit for carrying out the process.

FIG. 4 shows a circuit arrangement for the control of the transducer WT with its three windings WT1, WT2 and RT for the information signal recording by the NRZ process described above. The read winding RT is connected with an amplifier system RA which for example is of the type 3467P available from Motorola and serves as a so-called read system for the evaluation of magnetic storage recordings. The amplifier system RA, also designated as a read amplifier in the following, controls the timing input T of a flip-flop circuit FF of the type 7470 available from Texas Instruments. The Q output of this flip-flop circuit FF is connected with reversing inputs of two write amplifiers WA1 and WA2 which are of the type 75452 (Texas Instruments) and respectively control a write winding WT1 or WT2 for the activation of the first and second write gap W1 and W2. The reversing inputs of these two write amplifiers WA1 and WA2 operate in an intrinsically known manner in such a way that when a change in signal occurs they cause a reversal of their output signal and thus a reversal of the magnetization direction which is generated in the respective write gap W1 or W2.

Moreover a circuit INFO is provided which, as is likewise known in itself, can deliver the information signals to be recorded in a binary representation. It has an output W which can always deliver the binary state 1 when a write operation is to be done, that is, an information signal 0 or 1 is to be recorded. Another output W0/1 delivers the sequence of binary values 0 and 1 to be recorded.

The output W is connected with an inverting input of the first write amplifier WA1 and with an inverting clear input of the flip-flop circuit FF. Moreover it is run to the first input of an AND element G the second input of which is driven with the output signals of the output W0/1 of the circuit INFO. The output of the AND element G is connected with an inverting input of the second write amplifier WA2.

This circuit arrangement then operates as follows. The changes in magnetization detected at the read gap R are digitized by the amplifier system RA in such a way that corresponding control pulses for the flip-flop circuit FF occur at its output. This circuit is reversed by the control pulses in such a way that at its output Q alternating signal states occur with changes in magnetization, which states are fed to the reversal inputs of the write amplifiers WA1 and WA2, so that the latter, with any change in magnetization occurring at the read gap R, cause a reversal of the magnetization generated in the write gap W1 or W2 when they are effectively connected to their respective inverting inputs. This occurs for the write amplifier WA1 as a function of an output signal on the output W of the circuit INFO and for the write amplifier WA2 only when this output signal occurs, that is, a signal is to be recorded and at the same time the binary value 1 is to be recorded, which is caused by the conjunctive linkage of the AND element G when the output W0/1 of the circuit INFO deliver the binary value 1.

The circuit shown in FIG. 4 therefore causes the write amplifier WA1 to be always switched on when a signal is to be recorded, regardless of the binary value of this signal. This coincides with the activation states of the first write gap W1 shown in FIGS. 1 and 2. The second write ampifier WA2 is then connected in active form only when the binary value 1 is to be recorded, whereupon its reversal then occurs automatically in shorter intervals of time, since the recording is being done with the second write gap W2, which is at only half the distance from the read gap R compared with the distance from the first write gap W1.

When no recording is to be done, then the binary value 0 appears at the output W of the circuit INFO and, by way of the inverting clear input of the flip-flop circuit FF, causes the latter to be set in a defined output state. Besides this, the write amplifier WA1 is disconnected.

It must also be recognized that when the binary value 0 occurs at the output W0/1 of the circuit INFO, the second write amplifier WA2 is disconnected when recording is to be done and the output W of the circuit INFO delivers the binary value 1. This serves to prevent interfering recordings, as is further described above.

I claim:

1. A method of writing data on a magnetic storage medium which travels relative to a magnetic head of the type having a first write gap and a read gap spaced apart along a travel axis by a distance which establishes a bit spacing in the medium, and a second write gap between the first write gap and the read gap, which method comprises the steps of:
    A. causing relative movement between the head and medium along the travel axis;
    B. actuating the first write gap to cause a flux transition in the medium;
    C. generating a signal representing the arrival of said flux transition at the read gap; and
    D. using said signal to substantially contemporaneously activate the first write gap to cause a second flux transition which, in combination with the first transition, represents a data value.

2. The method of claim 1 including the further steps of:
    E. subsequently generating a second signal representing the arrival of the second flux transition at the read gap; and
    F. using said second signal to substantially contemporaneously activate both the first and second write heads to cause third and fourth flux transitions which, in combination with the second transition represent a data value.

3. The method of claim 2 wherein the third and fourth flux transitions are of the same sense.

4. A method of writing data on a magnetic storage medium which travels relative to a magnetic head of the type having a first write gap and a read gap spaced apart along a travel axis by a distance which establishes a bit spacing in the medium, and a second write gap between the first write gap and the read gap, which method comprises the steps of:
    A. causing relative movement between the head and the medium along the travel axis;
    B. activating the first write gap to cause a flux transition in the medium;
    C. generating a signal representing the arrival of said flux transition at the read head; and
    D. using said signal to substantially contemporaneously activate the first and second write heads to cause second and third flux transitions in the medium which, in combination with the first transition, represent a data value.

5. Apparatus for writing data values into a magnetic storage medium by way of the arrangement and lineal spacing of flux transitions in the medium comprising:

a head adapted for placement proximate a magnetic storage medium to permit relative lineal travel therebetween and to both cause and sense flux transitions in the medium;

said head having a first write gap and a read gap spaced apart in the direction of relative travel by a distance which establishes a bit spacing in the medium regardless of the speed of the relative movement;

said head further having a second write gap between the first write gap and the read gap; and means associated with said head for responding to the arrival at flux transitions at said read head and for substantially contemporaneously with said arrival activating (a) the first write gap to write data of a first value and (b) both the first and second write heads to write data of a second value.

* * * * *